United States Patent
Ohnishi et al.

(10) Patent No.: US 6,770,694 B2
(45) Date of Patent: Aug. 3, 2004

(54) POWDER COATING COMPOSITION FOR FORMING MULTILAYER FILM

(75) Inventors: Kazuhiko Ohnishi, Yokohama (JP); Isamu Takabayashi, Yokohama (JP); Masami Kobata, Hiratsuka (JP)

(73) Assignee: Kansai Paint Co., Ltd., Amagasaki (JP)

( * ) Notice: Subject to any disclaimer, the term of this patent is extended or adjusted under 35 U.S.C. 154(b) by 26 days.

(21) Appl. No.: 10/126,681

(22) Filed: Apr. 22, 2002

(65) Prior Publication Data

US 2003/0045613 A1 Mar. 6, 2003

Related U.S. Application Data

(63) Continuation of application No. 09/485,406, filed on Feb. 10, 2000, now abandoned.

(30) Foreign Application Priority Data

Aug. 12, 1997 (JP) ............................................. 9-217266
Aug. 28, 1997 (JP) ............................................. 9-231929
Dec. 2, 1997 (JP) ............................................. 9-331333

(51) Int. Cl.$^7$ ................................................. C08K 3/32
(52) U.S. Cl. ....................................... 524/414; 524/418
(58) Field of Search ................................. 524/414, 418

(56) References Cited

U.S. PATENT DOCUMENTS

| 4,246,368 A | 1/1981 | Murase | 525/117 |
|---|---|---|---|
| 5,380,614 A | 1/1995 | Tetsuka | 430/106 |
| 5,536,613 A | 7/1996 | Chang | 430/137 |
| 5,556,732 A | 9/1996 | Chow | 430/137 |

OTHER PUBLICATIONS

Supplementary European Search report date Aug. 3, 2000.

*Primary Examiner*—Edward J. Cain
(74) *Attorney, Agent, or Firm*—Armstrong, Kratz, Quintos, Hanson & Brooks, LLP

(57) ABSTRACT

The present invention provides a powder coating composition for forming a multilayer film, obtainable by dry blending a lower layer-forming thermosetting powder coating material (A) and an upper layer-forming thermosetting powder coating material (B), wherein at least one of the following conditions is satisfied: (I) the material (A) contains an onium salt compound; (II) particles of 45 $\mu$m or smaller diameter account for at least 90 wt. % of each of the materials (A) and (B); and (III) the material (A) is higher than the material (B) in melt viscosity (Pa·s) measured at 130° C.

The powder coating composition of the invention is capable of sufficiently separating into layers and forming a multilayer film with excellent properties.

12 Claims, 2 Drawing Sheets

POWDER COATING COMPOSITION FOR FORMING MULTILAYER FILM

This application is a continuation of prior application Ser. No. 09/485,406 filed Feb. 10, 2000 now abandoned

TECHNICAL FIELD

The present invention relates to a novel powder coating composition capable of forming a multilayer film excellent in finished appearance, weather resistance and other properties.

BACKGROUND ART

Powder coating compositions do not necessitate organic solvents and thus are advantageous from the viewpoints of environmental protection and saving of resources. They are therefore widely utilized in industrial products such as electric appliances, automobiles, vehicles, office goods, steel furniture and construction materials.

Japanese Examined Patent Publication No. 14577/1978 and Japanese Unexamined Patent Publication No. 105135/1979 disclose powder coating compositions prepared by dry blending a lower layer-forming thermosetting powder coating material and an upper layer-forming thermosetting powder coating material. The powder coating compositions are applied to a substrate by powder coating and then thermally melted to form a multilayer film.

In the above powder coating compositions, mainly used as the upper layer-forming coating material are acrylic resin thermosetting powder coating materials or polyester resin thermosetting powder coating materials which are resistant to deterioration by sunlight and excellent in film appearance and weather resistance, but poor in corrosion resistance. Chiefly used as the lower layer-forming coating material are epoxy resin-based thermosetting powder coating materials which are excellent in corrosion resistance and adhesion to the substrate but poor in weather resistance.

However, these conventional powder coating compositions for forming a multilayer film have the drawback that, when the compositions are applied to the substrate by powder coating and heated to form a multilayer film, they do not sufficiently separate into upper and lower layers and thus result in a multilayer film poor in finished appearance, weather resistance and other properties.

For removing such a drawback, Japanese Examined Patent Publication No. 21545/1988 proposes a method for forming a multilayer film comprising the steps of surface-treating a substrate with an onium salt compound and applying a powder coating composition for forming a multilayer film prepared by dry blending a lower layer-forming thermosetting powder coating material and an upper layer-forming thermoplastic powder coating material. The proposed method, however, is industrially disadvantageous because the surface treatment increases the number of steps involved in the method. Further, the method requires troublesome procedures to produce suitable conditions for the surface treatment.

DISCLOSURE OF INVENTION

An object of the present invention is to provide a novel powder coating composition for forming a multilayer film, which is free from the above drawbacks of the prior art.

Another object of the present invention is to provide a novel powder coating composition capable of forming a multilayer film excellent in finished appearance, weather resistance and other properties.

Other objects and features of the present invention will be apparent from the following description.

The present invention provides a powder coating composition for forming a multilayer film, obtainable by dry blending a lower layer-forming thermosetting powder coating material (A) and an upper layer-forming thermosetting powder coating material (B), wherein at least one of the following conditions is satisfied: (I) the material (A) contains an onium salt compound; (II) particles of 45 μm or smaller diameter account for at least 90 wt. % of each of the materials (A) and (B); and (III) the material (A) is higher than the material (B) in melt viscosity (Pa·s) measured at 130° C.

The present inventors conducted extensive research to solve the above problems of the prior art and found that a powder coating composition satisfying one of the above conditions (I), (II) and (III) necessitates no surface treatment and is capable of forming a multilayer film excellent in finished appearance, weather resistance and other properties, since the composition sufficiently separates into upper and lower layers.

The present invention has been accomplished based on these novel findings.

It is a matter of course that a powder coating composition satisfying two or all of the conditions (I), (II) and (III) achieves equivalent or superior results.

The powder coating composition satisfying the condition (I) is a powder coating composition obtainable by dry blending a lower layer-forming thermosetting powder coating material (A) and an upper layer-forming thermosetting powder coating material (B), wherein the material (A) contains an onium salt compound. Such a powder coating composition is capable of sufficiently separating into upper and lower layers and forming a multilayer film with excellent properties.

Usable onium salts include those represented by the formula:

$$[(R)_4Y]^+X^- \quad (1)$$

or the formula:

$$[(R)_3S]^+X^- \quad (2)$$

wherein R's are the same or different and each represent hydrogen, lower alkyl, hydroxy lower alkyl, halo lower alkyl, lower alkoxy lower alkyl, cycloalkyl, aryl, aralkyl or like organic group; Y represents a nitrogen atom or phosphorus atom; X represents an anionic ion such as a halogen ion, inorganic acid group, organic acid group or the like. In the above definitions, "lower" means a carbon number of 6 or less.

Examples of lower alkyl include methyl, ethyl, propyl, butyl and hexyl. Examples of hydroxy lower alkyl include hydroxymethyl, hydroxyethyl, hydroxypropyl, hydroxybutyl and hydroxyhexyl. Examples of halo lower alkyl include bromomethyl and bromoethyl. Examples of lower alkoxy lower alkyl include methoxymethyl, methoxyethyl, methoxypropyl, methoxybutyl and methoxyhexyl. Examples of cycloalkyl include cyclohexyl, cyclohexylmethyl and cyclopentyl. Examples of aryl include phenyl, toluyl and xylyl. Examples of aralkyl include benzyl. Examples of halogen ions include chlorine ion, bromine ion, fluorine ion and iodine ion. Examples of inorganic acid groups include sulfuric acid group and phosphoric acid group. Examples of organic acid groups include acetic acid group, benzylsulfonic acid group and hydroxyl group. In the above formulas, R is preferably lower alkyl, phenyl or benzyl, and X is preferably a halogen ion. Preferable examples of onium salt compounds include ammonium salt compounds and phosphonium salt compounds.

Specific examples of onium salt compounds include tetramethyl phosphonium chloride, tetraethyl phosphonium chloride, tetrabutyl phosphonium chloride, trimethylethyl phosphonium chloride, triphenylbenzyl phosphonium chloride, tetramethyl phosphonium bromide, triphenylbenzyl phosphonium bromide and like phosphonium salt compounds; tetramethyl ammonium chloride, tetraethyl ammonium chloride, tetrabutyl ammonium chloride, trimethylethyl ammonium chloride, triphenylbenzyl ammonium chloride, tetramethyl ammonium bromide, triphenylbenzyl ammonium bromide and like ammonium salt compounds; and trimethyl sulfonium chloride, tetraethyl sulfonium chloride, tetrabutyl sulfonium chloride, trimethylethyl sulfonium chloride, triphenylbenzyl sulfonium chloride and like sulfonium salt compounds.

The proportion of the onium salt compound is preferably 0.01 to 10 parts by weight, particularly 0.01 to 5 parts by weight, relative to 100 parts by weight of the base resin of the material (A). If the proportion is less than 0.01 parts by weight, the resulting composition does not sufficiently separate into upper and lower layers and the boundary of the two layers become uneven, reducing smoothness and gloss of the film surface. On the other hand, a proportion exceeding 10 parts by weight does not further improve the separability of the composition, hence undesirable. When the material (A) is a thermosetting epoxy resin powder coating material, it is preferable to use the onium salt compound in a proportion of 0.01 to 2.0. parts by weight, particularly 0.01 to 1.0 parts by weight, relative to 100 parts by weight of the base resin, since the onium salt compound acts as a curing catalyst for the powder coating material. In this case, proportions outside the range from 0.01 to 2.0 are undesirable since the resulting coating composition has reduced separativity and forms a film poor in appearance characteristics such as smoothness and gloss and in performance characteristics such as weather resistance and curability.

The onium salt compound can be incorporated into the material (A) by melt blending or dry blending, preferably by melt blending.

The powder coating composition satisfying the condition (II) is a powder coating composition obtainable by dry blending a lower layer-forming thermosetting powder coating material (A) and an upper layer-forming thermosetting powder coating material (B), wherein particles of 45 $\mu$m or smaller diameter account for at least 90 wt. % of each of the materials (A) and (B). Such a powder coating composition is capable of sufficiently separating into upper and lower layers and forming a multilayer film with excellent properties. If the proportion of particles of 45 $\mu$m or smaller diameter is less than 90 wt. % and particles of a diameter larger than 45 $\mu$m are present in a relatively large amount, the resulting composition has reduced separability, so that when the composition is thermally melted to form a multilayer film, part of the material (A) will rise to the surface of the upper layer formed from the material (B) and impair the appearance and performance characteristics of the film.

It is preferable that particles of 5 $\mu$m to 45 $\mu$m diameter, more preferably 10 $\mu$m to 40 $\mu$m diameter, account for at least 90 wt. %, particularly at least 95 wt. %, of each of the materials (A) and (B). If particles of 5 $\mu$m or smaller diameter are present in a relatively large amount, the application workability tends to reduce owing to electrostatic repulsion or other factors.

To obtain the materials (A) and (B) wherein particles of 45 $\mu$m or smaller diameter account for at least 90 wt. %, classification by sieving can be employed, for instance.

The powder coating composition satisfying the condition (III) is a powder coating composition obtainable by dry blending a lower layer-forming thermosetting powder coating material (A) and an upper layer-forming thermosetting powder coating material (B), wherein the material (A) is higher than the material (B) in melt viscosity (Pa·s) measured at 130° C. Such a powder coating composition is capable of sufficiently separating into upper and lower layers and forming a multilayer film with excellent properties. If the material (A) is equal to or lower than the material (B) in melt viscosity, the material (A) will rise to the surface of the multilayer film, and causes film defects such as blurring or adversely affects performance characteristics of the film such as weather resistance and corrosion resistance. Some combinations of the materials (A) and (B) may produce films which appear to comprise separate layers when observed with the naked eye, even if the material (A) is equal to or-lower than the material (B) in melt viscosity. However, microscopic observation will reveal the presence of the material (A) on the surface of such films.

For separating the composition more completely into layers, it is desirable that the material (A) has a melt viscosity (Pa·s) at least three times higher than that of the material (B). Further, it is suitable that the material (A) has a melt viscosity of 1 to 100 Pa·s, preferably 5 to 70 Pa·s, and the material (B) has a melt viscosity of 0.1 to 10 Pa·s, preferably 1 to 8 Pa·s.

As used herein, the melt viscosity (Pa·s) is the value measured at 130° C. using "Quartz Reometer QRT-3000" (tradename, a product of Tokyo Denpa Kiki K.K.).

The reason for measuring the melt viscosity of the materials at 130° C. is that when, for example, a thermosetting acrylic resin powder coating material and thermosetting epoxy resin powder coating material in a dry blended composition are applied to a substrate and baked at 200° C. (a temperature of the atmosphere in a heating furnace), they separate into layers usually at about 100 to 140° C., although depending on the rate of temperature increase of the substrate.

The material (A) has a melt viscosity higher than that of the material (B) when, for example, the material (A) is higher in pigment concentration than the material (B), or when the base resin of the material (A) is higher in molecular weight than that of the material (B).

The thermosetting powder coating materials (A) and (B) may be any of known powder coating materials which are incompatible or poorly compatible with each other and capable of forming a multilayer film when thermally melted.

The lower layer-forming thermosetting powder coating material (A) used in the present invention may be a per se known powder coating material for forming a lower layer of a multilayer film. A thermosetting epoxy resin powder coating material is preferred as the material (A), since it is excellent in separability, corrosion resistance and adhesion to the substrate. Thermosetting epoxy resin powder coating materials will be specifically described below.

Thermosetting epoxy resin powder coating materials are coating materials which can be applied by powder coating and thermally cured, and which comprise an epoxy resin as a base resin and a curing agent for the epoxy resin.

The base resin may be, for example, a bisphenol-epichlorohydrin epoxy resin (e.g., "EPIKOTE 1004" and "EPIKOTE 1007" manufactured by Yuka Shell K.K.), a novolac epoxy resin, or the like. The resin has an epoxy equivalent of usually about 120 to 8000. Usable curing agents include, for example, adipic acid, trimellitic acid, trimellitic anhydride and like polycarboxylic acid compounds; benzyl-4-hydroxyphenylmethyl sulfonium hexafluoroantimonate and like aromatic sulfonium salts which serve as cationic polymerization catalysts; dicyandiamide and like amide compounds; adipic acid dihydrazide and like carboxylic acid dihydrazide compounds; imidazoline compounds; imidazole compounds; phenolic resins; and polyester resins with a high acid value.

The proportion of the curing agent to the base resin is as follows: When the curing agent is a cationic polymerization catalyst, the catalyst is used in a proportion of usually about 0.01 to 10 parts by weight, preferably about 0.1 to 5 parts by weight, relative to 100 parts by weight of the base resin. When a curing agent other than cationic polymerization catalysts is used, the proportion of the curing agent is usually about 10 to 100 parts by weight, preferably about 15 to 80 parts by weight, relative to 100 parts by weight of the base resin.

The material (A) may contain, where necessary, an anticorrosive agent, color pigment, extender pigment, filler, curing catalyst, fluidity modifier, anti-cissing agent or like additive for coating compositions.

The upper layer-forming thermosetting powder coating material (B) used in the present invention may be a per se known powder coating material for forming an upper layer of a multilayer film. A themosetting acrylic resin powder coating material or themosetting polyester resin powder coating material is preferred as the material (B), since these coating materials are excellent in weather resistance and processability. These coating materials will be specifically described below.

Thermosetting acrylic resin powder coating materials are coating materials which can be applied by powder coating and thermally cured, and which comprise an acrylic resin as a base resin and a curing agent for the acrylic resin. Examples of such powder coating materials include a powder coating material (a) comprising an epoxy-containing acrylic resin as a base resin and a polycarboxylic acid crosslinking agent as a curing agent; and a powder coating material (b) comprising a hydroxyl-containing arylic resin as a base resin and a blocked polyisocyanate crosslinking agent as a curing agent.

Usable as the base resin of the material (a) are epoxy-containing acrylic resins obtained by radically copolymerizing an epoxy-containing radically polymerizable unsaturated monomer and a hard acrylic monomer with a glass transition temperature of 40° C. or higher, and where necessary, a soft acrylic monomer with a glass transition temperature lower than 40° C., a radically polymerizable unsaturated monomer containing a functional group other than epoxy groups, and another radically polymerizable unsaturated monomer. The resin has an epoxy equivalent of usually about 120 to 8000. Examples of epoxy-containing radically polymerizable unsaturated monomers include glycidyl (meth)acrylate and methylglycidyl (meth)acrylate. Examples of hard acrylic monomers with a glass transition temperature of 40° C. or higher include methyl methacrylate, ethyl methacrylate, iso-butyl methacrylate, tert-butyl methacrylate and tert-butyl acrylate. Examples of soft acrylic monomers with a glass transition temperature less than 40° C. include methyl acrylate, ethyl acrylate, n-butyl methacrylate, iso-butyl acrylate, 2-ethylhexyl (meth)acrylate and stearyl methacrylate. Examples of radically polymerizable unsaturated monomers containing a functional group other than epoxy groups include hydroxyethyl (meth)acrylate and hydroxypropyl (meth)acrylate. Examples of other radically polymerizable unsaturated monomers include styrene, vinyl toluene, α-methylstyrene, (meth)acrylonitrile and (meth)acrylamide. Examples of polycarboxylic acid crosslinking agents include adipic acid, azelaic acid, dodecanedionic acid, adipic anhydride and trimellitic anhydride.

Usable as the base resin of the powder coating material (b) are hydroxyl-containing acrylic resins obtained by radically copolymerizing a hydroxyl-containing radically polymerizable unsaturated monomer and a hard acrylic monomer with a glass transition temperature of 40° C. or higher, and where necessary, a soft acrylic monomer with a glass transition temperature less than 40° C., a radically polymerizable unsaturated monomer containing a functional group other than hydroxyl groups and another radically polymerizable unsaturated monomer. The resin has a hydroxyl value of usually about 20 to 200 mg KOH/g. Examples of hydroxyl-containing radically polymerizable unsaturated monomers include hydroxyethyl (meth)acrylate and hydroxypropyl (meth)acrylate. Examples of radically polymerizable unsaturated monomers containing a functional group other than hydroxyl groups include glycidyl (meth)acrylate and methylglycidyl (meth)acrylate. Examples of hard acrylic monomers with a glass transition temperature of 40° C. or higher, soft acrylic monomers with a glass transition temperature less than 40° C. and other radically polymerizable unsaturated monomers are as given above. The blocked polyisocyanate crosslinking agent is, for example, an aliphatic or alicyclic polyisocyanate compound wherein the isocyanate groups are blocked with a phenol, lactam, alcohol, oxime or like blocking agent. Examples of aliphatic or alicyclic polyisocyanate compounds include hexamethylene diisocyanate, trimethylene diusocyanate, isophorone duisocyanate and hydrogenated xylylene diisocyanate.

In the materials (a) and (b), the proportion of the curing agent to the base resin is usually about 10 to 100 parts by weight of the curing agent relative to 100 parts by weight of the base resin.

The thermosetting polyester resin powder coating material for use as the material (B) in the present invention is, for example, a powder coating material (c) which can be applied by powder coating and thermally cured, and which comprises a hydroxyl-containing polyester resin as a base resin and a blocked polyisocyanate crosslinking agent as a curing agent.

The base resin of the material (c) is, for example, a hydroxyl-containing polyester resin obtained by reacting an aromatic or alicyclic dicarboxylic acid and a dihydric alcohol, and where necessary, a monocarboxylic acid, a tri- or higher carboxylic acid and a tri- or higher hydric alcohol. The resin has a hydroxyl value of usually about 20 to 300 mg KOH/g. Examples of aromatic or alicyclic dicarboxylic acids include phthalic acid, phthalic anhydride, isophthalic acid, terephthalic acid, dimethyl isophthalate, dimethyl terephthalate, hexahydrophthalic acid, hexahydrophthalic anhydride, tetrahydrophthalic acid and tetrahydrophthalic anhydride. Examples of dihydric alcohols include (poly)ethylene glycol, (poly)propylene glycol, butylene glycol, neopentyl glycol, 1,6-hexanediol and dimethyl propionic acid. Examples of monocarboxylic acids include benzoic acid. Examples of tri- or higher carboxylic acids include trimellitic acid and trimellitic anhydride. Examples of tri- or higher hydric alcohols include trimethylol ethane, trimethylol propane, glycerine and pentaerythritol. Examples of blocked polyisocyanate crosslinking agents are as given above.

In the material (c), the proportion of the curing agent to the base resin is usually about 10 to 100 parts by weight, preferably about 15 to 80 parts by weight, of the curing agent relative to 100 parts by weight of the base resin.

The upper layer-forming thermosetting powder coating material (B) may contain, where necessary, an antimicrobial agent. The antimicrobial agent may be, for example, an inorganic antimicrobial agent comprising an inorganic compound and silver ions supported on the inorganic compound, or an organic antimicrobial agent such as zinc pyrithione.

Known inorganic compounds having silver ions supported thereon can be used as an inorganic antimicrobial agent without limitations. Examples of inorganic compounds for supporting silver ions include activated carbon, activated alumina, silica gel and other inorganic adsorbents, zeolite, hydroxy apatite, zirconium phosphate, titanium phosphate, potassium titanate, hydrated bismuth oxide and hydrated zirconium oxide.

For supporting silver ions on the inorganic compounds, known methods can be employed without limitation. Useful methods include physical or chemical adsorption of silver ions on an inorganic compound; ion exchange reaction for supporting silver ions on an inorganic ion exchanger; bonding of silver ions to an inorganic compound with a binder; embedment of a silver compound into an inorganic compound by impact; vapor deposition; dissolution-precipitation reaction; and thin layer forming processes such as spatter, which form a thin layer of a silver compound on the surface of an inorganic compound.

Among the above methods, ion exchange reaction is preferable since the silver ions can be rigidly supported. Preferred inorganic exchangers include zeolite and zirconium phosphate. Specific examples of antimicrobial agents prepared by this method include commercial products "NOVALON AG-300" (silver ion-supporting zirconium phosphate manufactured by Toa Gosei Kagaku K.K.) and "Zeomic AW-10D" (silver ion-supporting zeolite manufactured by Shinanen New Ceramic Co., Ltd.).

It is desirable that the silver ion-supporting inorganic antimicrobial agent is in the form of a fine powder with an average particle size of 0.001 to 20 $\mu$m, preferably 0.01 to 10 $\mu$m, from the viewpoints of finished appearance of the coating film and effective area of the antimicrobial agent.

The proportion of the silver ion-supporting inorganic antimicrobial agent is preferably 0.05 to 50 parts by weight, more preferably about 0.5 to 10 parts by weight, relative to 100 parts by weight of the base resin, from the viewpoints of antimicrobial effect and economy.

Organic antimicrobial agents such as zinc pyrithione include, for example, bis(pyridine-2-thiol-1-oxide) zinc salt. It is desirable that the bis(pyridine-2-thiol-1-oxide) zinc salt is in the form of a fine powder with an average particle size of 0.001 to 20 $\mu$m, preferably 0.01 to 10 $\mu$m, from the viewpoints of finished appearance of the coating film and effective area of the antimicrobial agent.

The proportion of the bis(pyridine-2-thiol-1-oxide) zinc salt is preferably 0.001 to 20 parts by weight, more preferably 0.05 to 5 parts by weight, relative to 100 parts by weight of the base resin, from the viewpoints of the antimicrobial effect, prevention of discoloration and economy.

The powder coating material (B) may contain, where necessary, an oil repellent, UV stabilizer, UV absorber (such as benzotriazole compound), color pigment, extender pigment, filler, curing catalyst, fluidity modifier, anti-cissing agent or like additive for coating compositions.

In the powder coating composition of the invention, the materials (A) and (B) are used each in a proportion of about 30 to 70 wt. %, in particular about 40 to 60 wt. %.

The powder coating composition of the invention can be prepared by dry blending the two powder coating materials (A) and (B) in a mixer such as a Henschel mixer or a mill such as an atomizer or jet mill.

The powder coating composition of the invention usually has an average particle size of 5 to 100 $\mu$m, preferably 10 to 80 $\mu$m. If the average particle size is less than 5 $\mu$m, the application workability of the powder coating composition lowers, whereas an average particle size exceeding 100 $\mu$m lowers the coating efficiency and film appearance.

The powder coating composition of the invention can be applied to a substrate by corona electrostatic coating, frictional electrification coating, fluidized-dipping, hot fluidized-dipping or like powder coating process. The coating film is preferably about 30 to 1000 $\mu$m thick, more preferably about 40 to 500 $\mu$m thick, when cured. The composition applied is baked usually at about 120 to 200° C. for about 10 to 60 minutes.

Usable substrates include conventional substrates amenable to powder coating and free from thermal deformation. Specific examples are those made of iron, steel, copper, stainless steel, alloy steels, aluminum and its alloys, zinc, zinc-plated steels, zinc alloys, tin-plated steels, zinc phosphate- or iron phosphate-treated steels and like metals, and glasses. The substrate may be a plate or a shaped article such as a pipe, box, wire or frame. A primer coating or intermediate coating may be applied to the surface of the substrate.

BRIEF DESCRIPTION OF THE DRAWINGS

In FIGS. 1 and 2, the numerals indicate the following: upper layer, lower layer, substrate, lower layer.

BEST MODE FOR CARRYING OUT THE INVENTION

Figure 1:
FIG. 1 is a photograph substituted for a drawing, which was taken using an optical microscope (magnification of 200) and shows a cross section of a multilayer film formed from the powder coating composition of the present invention obtained in Example 1.

The present invention will be described in further detail with reference to Production Examples, Examples and Comparative Examples, wherein parts and percentages are all by weight.

Powder Coating Composition Comprising Lower Layer-forming Powder Coating Material (A) and Upper Layer-forming Powder Coating Material (B) Wherein the Material (A) Contains Onium Salt Compound

PRODUCTION EXAMPLE 1

Production of Upper Layer-forming Thermosetting Acrylic Resin Powder Coating Material (i)

290 parts of dodecanedioic acid and 500 parts of titanium dioxide pigment were added to 1000 parts of a glycidyl-containing acrylic powder resin (monomer weight ratio:

glycidyl methacrylate/styrene/methyl methacrylate/n-butyl acrylate=40/10/20/30, average molecular weight: 8000, epoxy equivalent: 360, softening point: 85° C., average particle size: about 35 μm). The obtained mixture was melted and kneaded in a twin-screw extruder, cooled, ground and sieved through a 200-mesh sieve, to thereby obtain a white powder coating material (i) with an average particle size of about 35 μm.

Of the obtained material (i), particles of 5 to 45 μm diameter accounted for 90%. The material had a melt viscosity of 4 Pa·s as measured at 130° C.

PRODUCTION EXAMPLE 2
Production of Lower Layer-forming Thermosetting Epoxy Resin Powder Coating Material (ii)

500 parts of adipic acid dihydrazide, 5.1 parts of benzyltetraphenyl phosphonium chloride salt and 200 parts of red iron oxide were added to 1000 parts of "EPIKOTE 1004" (tradename, a bisphenol-epichlorohydrine epoxy resin manufactured by Yuka Shell K.K., softening point: 97 to 103° C., average molecular weight: about 1400, epoxy equivalent: 900). The resulting mixture was melted and kneaded in a twin-screw extruder, cooled, ground and sieved through a 200-mesh sieve, to thereby obtain a red powder coating material (ii) with an average particle size of about 30 μm.

Of the obtained material (ii), particles of 5 to 45 μm diameter accounted for 90%. The material had a melt viscosity of 30 Pa·s as measured at 130° C.

PRODUCTION EXAMPLE 3
Production of Lower Layer-forming Thermosetting Epoxy Resin Powder Coating Material (iii)

A red powder coating material (iii) with an average particle size of about 50 μm was produced by following the procedure of Production Example 2 except that no benzyltetraphenyl phosphonium chloride salt was used and the sieving step was modified so as to obtain a material with a larger particle size.

Of the obtained material (iii), particles of 5 to 45 μm diameter accounted for 81%. The material had a melt viscosity of 25 Pa·s as measured at 130° C.

PRODUCTION EXAMPLE 4
Production of Lower Layer-forming Thermosetting Epoxy Resin Powder Coating Material (iv)

A red powder coating material (iv) with an average particle size of about 50 μm was produced by following the procedure of Production Example 2 except that benzyltetraphenyl phosphonium chloride salt was used in an amount of 30 parts and the sieving step was modified so as to obtain a material with a larger particle size.

Of the obtained material (iv), particles of 5 to 45 μm diameter accounted for 80%. The material had a melt viscosity of 40 Pa·s as measured at 130° C.

EXAMPLE 1

Dry blended in a Henschel mixer were 500 parts of the thermosetting acrylic resin powder coating material (i) of Production Example 1 and 500 parts of the thermosetting epoxy resin powder coating material (ii) of

PRODUCTION EXAMPLE 2.

The obtained composition was applied by electrostatic powder coating to a zinc phosphate-treated steel plate as the substrate to a thickness of 80 μm (when cured). The coating was baked at 180° C. for 30 minutes to form a multilayer film. FIG. 1 is a photograph of a cross section of the multilayer film, which was taken using an optical microscope (magnification of 200). In FIG. 1, indicates an upper layer formed from the powder coating material (i), indicates a lower layer formed from the powder coating material (ii), and indicates a zinc phosphate-treated steel plate as the substrate. FIG. 1 reveals that the upper layer of the acrylic resin powder coating material and the lower layer of the epoxy resin powder coating material completely separated from each other.

COMPARATIVE EXAMPLE 1

A comparative powder coating composition was produced by dry blending in a Henschel mixer 500 parts of the thermosetting acrylic resin powder coating material (i) of Production Example 1 and 500 parts of the thermosetting epoxy resin powder coating material (iii) of Production Example 3.

Figure 2:
FIG. 2 is a photograph substituted for a drawing, which was taken using an optical microscope (magnification of 200) and shows a cross section of a multilayer film formed from the comparative powder coating composition obtained in Comparative Example 1.

Using the obtained composition, a multilayer film was formed in the same manner as in Example 1. FIG. 2 is a photograph of a cross section of the multilayer film, which was taken using an optical microscope (magnification of 200). In FIG. 2, indicates an upper layer formed from the powder coating material (i), indicates a lower layer formed from the powder coating material (iii) and indicates a zinc phosphate-treated steel plate as the substrate. FIG. 2 shows that the upper layer of the acrylic resin powder coating material and the lower layer of the epoxy resin powder coating material had an uneven boundary, indicating that these coating materials did not sufficiently separate from each other.

COMPARATIVE EXAMPLE 2

A comparative powder coating composition was produced by dry blending in a Henschel mixer 500 parts of the thermosetting acrylic resin powder coating material (i) of Production Example 1 and 500 parts of the thermosetting epoxy resin powder coating material (iv) of Production Example 4.

Using the obtained composition, a multilayer film was formed in the same manner as in Example 1.

Properties of the multilayer films obtained in Example 1 and Comparative Examples 1 and 2 were determined by the following methods.

Film property test

Separation: Cross sections of the multilayer films were observed by the unaided eye and rated as follows: A; the upper and lower layers completely separated from each other by a clearly defined boundary, B; the upper and lower layers insufficiently separated from each other and had an uneven boundary, C; the film did not separate into layers and the two coating materials were present as mixed with each other.

Film appearance: The surfaces of the multilayer films were observed by the unaided eye and rated as follows: A; no irregularities, shrinkage or other abnormalities observed, B; some irregularities, shrinkage or other abnormalities observed, C; notable irregularities, shrinkage or other abnormalities observed.

Specular reflection: The specular gloss was measured according to JIS K 5400 at reflection angles of 60° and 20°.

Accelerated weather resistance: Using a Sunshine Weather-O-meter, a 500-hour weathering test was conducted, and the gloss retention and film appearance after the test were determined. The gloss retention was a retention (%) of specular gloss at a reflection angle of 60°, which was found according to the following equation:

Gloss retention=(gloss after test/initial gloss)×100

The film appearance was observed by the unaided eye and rated as follows: A; Substantially no change from the initial appearance, B; Slightly blurred as compared with the initial appearance, C; Blurred as compared with the initial appearance, D; Notably blurred as compared with the initial appearance.

Table 1 shows the test results.

TABLE 1

|  |  | Ex. 1 | Comp. Ex. 1 | Comp. Ex. 2 |
|---|---|---|---|---|
| Separation |  | A | B | C |
| Film appearance |  | A | B | C |
| Specular | 60° | 83 | 60 | 31 |
| Reflection | 20° | 61 | 43 | 22 |
| Accelerated weather resistance | Film appearance | A | C | C |
|  | Gloss retention (%) | 94 | 32 | 17 |

Powder Coating Composition Comprising Lower Layer-forming Powder Coating Material (A) and Upper Layer-forming Powder Coating Material (B). Wherein Particles of 45 μm or Smaller Diameter Account for at Least 90% of Each of the Materials (A) and (B)

PRODUCTION EXAMPLE 5

Production of Upper Layer-forming Thermosetting Acrylic Resin Powder Coating Material (v)

290 parts of dodecanedioic acid and 500 parts of titanium dioxide pigment were added to 1000 parts of a glycidyl-containing acrylic powder resin (monomer weight ratio: glycidyl methacrylate/styrene/methyl methacrylate/n-butyl acrylate=40/10/20/30, average molecular weight: 8000, epoxy equivalent: 360, softening point: 85° C., average particle size: about 35 μm). The obtained mixture was melted and kneaded in a twin-screw extruder, cooled, ground and sieved through a 400-mesh sieve, to thereby obtain a white powder coating material (v) with an average particle size of about 28 μm.

Of the obtained material (v), particles of 5 to 45 μm diameter accounted for 98%. The material had a melt viscosity of 4 Pa·s as measured at 130° C.

PRODUCTION EXAMPLE 6

Production of Lower Layer-forming Thermosetting Epoxy Resin Powder Coating Material (vi)

500 parts of adipic acid dihydrazide and 200 parts of red iron oxide were added to 1000 parts of "EPIKOTE 1004" (tradename, a bisphenol-epichlorohydrine epoxy resin manufactured by Yuka Shell-K.K., softening point: 97 to 103° C., average molecular weight: about 1400, epoxy equivalent: 900). The resulting mixture was melted and kneaded in a twin-screw extruder, cooled, ground and sieved through a 400-mesh sieve, to thereby obtain a red powder coating material (vi) with an average particle size of about 28 μm.

Of the obtained material (vi), particles of 5 to 45 μm diameter accounted for 98%. The material had a melt viscosity of 30 Pa·s as measured at 130° C.

PRODUCTION EXAMPLE 7

Production of Upper Layer-forming Thermosetting Acrylic Resin Powder Coating Material (vii)

A white powder coating material (vii) with an average particle size of about 52 μm was produced by following the procedure of Production Example 5 except that the sieving step was modified so as to obtain a material with a larger particle size.

Of the obtained material (vii), particles of 46 to 62 μm diameter accounted for 90%. The material had a melt viscosity of 4 Pa·s as measured at 130° C.

PRODUCTION EXAMPLE 8

Production of Lower Layer-forming Thermosetting Epoxy Resin Powder Coating Material (viii)

A red powder coating material (viii) with an average particle size of about 52 μm was produced by following the procedure of Production Example 6 except that the sieving step was modified so as to obtain a material with a larger particle size.

Of the obtained material (viii), particles of 46 to 62 μm diameter accounted for 90%. The material had a melt viscosity of 30 Pa·s as measured at 130° C.

EXAMPLE 2

A powder coating composition of the present invention was produced by dry blending in a Henschel mixer 500 parts of the thermosetting acrylic resin powder coating material (v) of Production Example 5 and 500 parts of the thermosetting epoxy resin powder coating material (vi) of Production Example 6.

Figure 3:
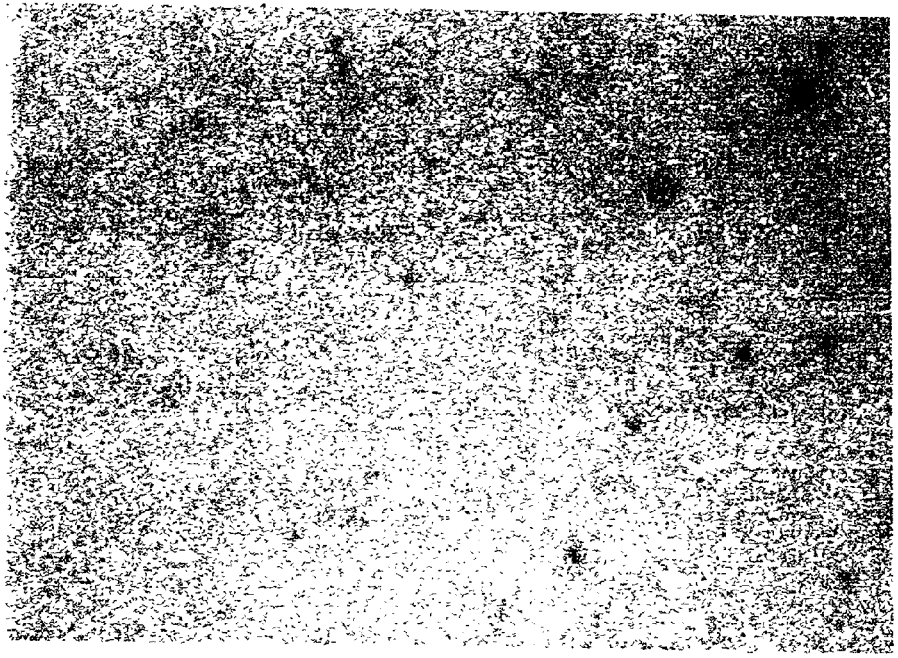
FIG. 3 is a photograph substituted for a drawing, which was taken using an optical microscope (magnification of 100) and shows the surface of a multilayer film formed from the powder coating composition of the present invention obtained in Example 2.

Using the obtained composition, a multilayer film was formed in the same manner as in Example 1. FIG. 3 is a photograph of the surface of the multilayer film, which was taken using an optical microscope (magnification of 100). FIG. 3 shows that substantially no epoxy resin powder coating material forming a lower layer rose to the surface of the upper layer (surface layer) formed from the acrylic resin powder coating material, and the upper and lower layers completely separated from each other.

COMPARATIVE EXAMPLE 3

A comparative powder coating composition was produced by dry blending in a Henschel mixer 500 parts of the thermosetting acrylic resin powder coating material (vii) of Production Example 7 and 500 parts of the thermosetting epoxy resin powder coating material (viii) of Production Example 8.

Figure 4:
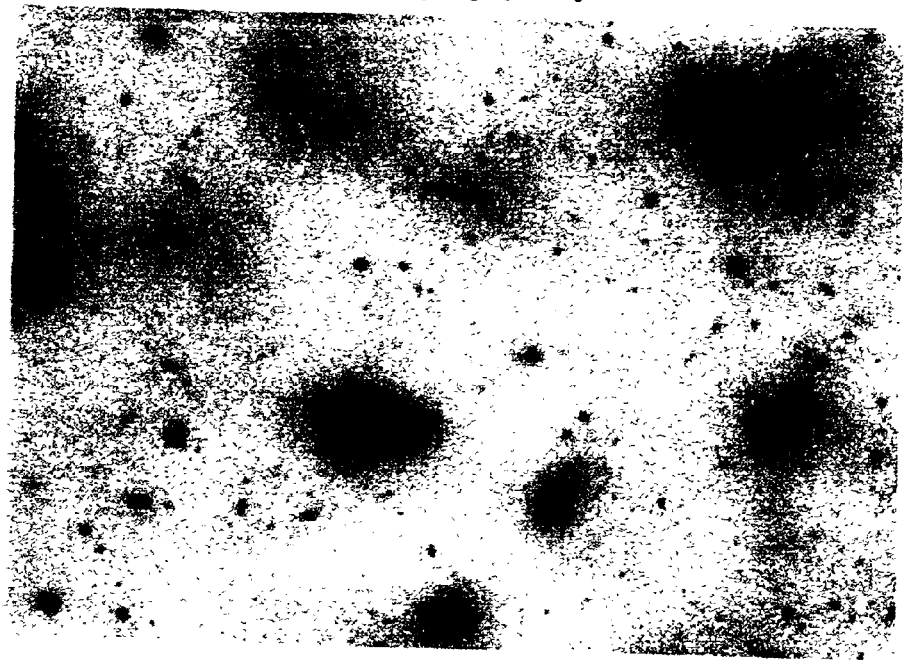
FIG. 4 is a photograph substituted for a drawing, which was taken using an optical microscope (magnification of 100) and shows the surface of a multilayer film formed from the comparative powder coating composition obtained in Comparative Example 3.

Using the obtained composition, a multilayer film was formed in the same manner as in Example 1. FIG. 4 is a photograph of the surface of the multilayer film, which was taken using an optical microscope (magnification of 200). FIG. 4 shows that a considerable amount of the lower layer-forming epoxy resin powder coating material rose to the surface of the upper layer (surface layer) formed from the acrylic resin powder coating material, and produced mottles on said surface, indicating that the coating film did not sufficiently separate into upper and lower layers.

COMPARATIVE EXAMPLE 4

A comparative powder coating composition was produced by dry blending in a Henschel mixer 500 parts of the thermosetting acrylic resin powder coating composition (vii) of Production Example 7 and 500 parts of the thermosetting epoxy resin powder coating composition (vi) of Production Example 6.

Using the obtained composition, a multilayer film was formed in the same manner as in Example 1.

COMPARATIVE EXAMPLE 5

A comparative powder coating composition was produced by dry blending in a Henschel mixer 500 parts of the thermosetting acrylic resin powder coating material (v) of Production Example 5 and 500 parts of the thermosetting epoxy resin powder coating material (viii) of Production Example 8.

Using the obtained composition, a multilayer film was formed in the same manner as in Example 1.

Table 2 shows properties of the multilayer films obtained in Example 2 and Comparative Example 3 to 5, as determined by the methods described above.

TABLE 2

|  |  | Ex. 2 | Comp. Ex. 3 | Comp. Ex. 4 | Comp. Ex. 5 |
|---|---|---|---|---|---|
| Separation |  | A | B | B | B |
| Film appearance |  | A | B | A | A |
| Specular | 60° | 75 | 60 | 65 | 64 |
| Reflecion | 20° | 65 | 45 | 48 | 47 |
| Accelerated weather resistance | Film appearance | A | B | B | B |
|  | Gloss retention (%) | 94 | 65 | 70 | 67 |

Powder Coating Composition Comprising Lower Layer-forming Powder Coating Material (A) and Upper Layer-forming Powder Coating Material (B). Wherein Material (A) is Higher than Material (B) in Melt Viscosity (Pa·s) Measured at 130° C.

PRODUCTION EXAMPLE 9

Production of upper layer-forming thermosetting acrylic resin powder coating material (ix)

200 parts of dodecanedioic acid and 80 parts of titanium dioxide pigment were added to 800 parts of a glycidyl-containing acrylic powder resin (monomer weight ratio: glycidyl methacrylate/styrene/methyl methacrylate/n-butyl acrylate=40/8/22/30, average molecular weight: 8000, epoxy equivalent: 360, softening point: 19° C., average particle size: about 35 $\mu$m). The obtained mixture was melted and kneaded in a twin-screw extruder, cooled, ground and sieved through a 200-mesh sieve, to thereby obtain a white powder coating material (ix) with an average particle size of about 30 $\mu$m.

Of the obtained material (ix), particles of 5 to 45 $\mu$m or smaller diameter accounted for 90%. The material had a melt viscosity of about 4 Pa·s as measured at 130° C.

PRODUCTION EXAMPLE 10

Production of Upper-layer-forming Thermosetting Acrylic Resin Powder Coating Material (x)

A white powder coating material (x) with an average particle size of about 30 $\mu$m was produced by following the procedure of Production Example 9 except for using the titanium dioxide pigment in an amount of 800 parts.

Of the obtained material (x), particles of 5 to 45 $\mu$m diameter accounted for 90%. The material had a melt viscosity of about 20 Pa·s as measured at 130° C.

PRODUCTION EXAMPLE 11

Production of Lower Layer-forming Thermosetting Epoxy Resin Powder Coating Material (xi)

500 parts of adipic acid dihydrazide and 300 parts of red iron oxide were added to 1000 parts of "EPIKOTE 1004" (tradename, bisphenol-epichlorohydrin epoxy resin manufactured by Yuka Shell K.K., softening point: 97 to 103° C., average molecular weight: about 1400, epoxy equivalent: 900). The obtained mixture was melted and kneaded in a twin-screw extruder, cooled, ground and sieved through a 200-mesh sieve, to thereby obtain a red powder coating material (xi) with an average particle size of about 30 $\mu$m.

Of the obtained material (xi), particles of 5 to 45 $\mu$m diameter accounted for 90%. The material had a melt viscosity of about 40 Pa·s as measured at 130° C.

PRODUCTION EXAMPLE 12

Production of Lower Layer-forming Thermosetting Epoxy Resin Powder Coating Material (xii)

A red powder coating material (xii) with an average particle size of about 30 $\mu$m was produced by following the procedure of Production Example 11 except that 10 parts of benzyltetraphenyl phosphonium chloride salt was further added.

Of the obtained material (xii), particles of 5 to 45 $\mu$m diameter accounted for 90%. The material had a melt viscosity of about 40 Pa·s as measured at 130° C.

PRODUCTION EXAMPLE 13

Production of Lower Layer-forming Thermosetting Epoxy Resin Powder Coating Material (xiii)

A red powder coating material (xiii) with an average particle size of about 50 $\mu$m was produced by following the procedure of Production Example 11 except that red iron oxide was used in an amount of 50 parts and the sieving step was modified so as to obtain a material with a larger particle size.

Of the obtained material (xiii), particles of 5 to 45 $\mu$m diameter accounted for 80%. The material had a melt viscosity of about 20 Pa·s as measured at 130° C.

EXAMPLE 3

A powder coating composition of the present invention was produced by dry blending in a Henschel mixer 500 parts of the thermosetting acrylic resin powder coating material (ix) of Production Example 9 and 500 parts of the thermosetting epoxy resin powder coating material (xi) of Production Example 11.

Using the obtained composition, a multilayer film was formed in the same manner as in Example 1.

EXAMPLE 4

A powder coating composition of the present invention was produced by dry blending in a Henschel mixer 500 parts of the thermosetting acrylic resin powder coating material (ix) of Production Example 9 and 500 parts of the thermosetting epoxy resin powder coating material (xii) of Production Example 12.

Using the obtained composition, a multilayer film was formed in the same manner as in Example 1.

COMPARATIVE EXAMPLE 6

A comparative powder coating composition was produced by dry blending in a Henschel mixer 500 parts of the thermosetting acrylic resin powder coating material (x) of Production Example 10 and 500 parts of the thermosetting epoxy resin powder coating material (xiii) of Production Example 13.

Using the obtained composition, a multilayer film was formed in the same manner as in Example 1.

Table 3 shows properties of the multilayer films obtained in Examples 3 and 4 and Comparative Example 6, as determined by the methods described above.

TABLE 3

|  |  | Ex. 3 | Ex. 4 | Comp. Ex. 6 |
|---|---|---|---|---|
| Separation |  | A | A | C |
| Film appearance |  | A | A | C |
| Specular | 60° | 77 | 89 | 30 |
| Reflecion | 20° | 53 | 71 | 14 |
| Accelerated weather resistance | Film appearance | A | A | C |
|  | Gloss retention (%) | 94 | 96 | 25 |

The powder coating composition for forming a multilayer film of the present invention is capable of sufficiently separating into upper and lower layers and forming a multilayer film excellent in finished appearance, weather resistance and other properties.

What is claimed is:

1. A powder coating composition for forming a multilayer film, obtained by dry blending a lower layer-forming thermosetting epoxy resin powder coating material (A) and an upper layer-forming thermosetting powder coating material (B) which is at least one member selected from thermosetting acrylic resin powder coating materials and thermosettmg polyester resin powder coating materials, the proportion of the material (A) to the material (B) being in the range of about 30 to 70 wt. % to about 70 to 30 wt. % based on the total weight of both materials, and the composition satisfying one of the following conditions (a) to (f):

(a) (I) the material (A) contains an onium salt compound;

(b) (II) particles of 45 µm or smaller diameter account for at least 90 wt. % of each of the materials (A) and (B);

(c) (I) the material (A) contains an onium salt compound; and
(II) particles of 45 µm or smaller diameter account for at least 90 wt. % of each of the materials A and B;

(d) (I) the material (A) contains an onium salt compound; and
(III) the material (A) is higher than the material (B) in melt viscosity (Pa·s) measured at 130° C.;

(c) (II) particles of45 µm or smaller diameter account for at least 90 wt. % of each of the materials A and B; and
(III)the matcrial (A) is higher than the material (B) in melt viscosity (Pa·s) measured at 130° C.; and (I) the material (A) contains an onium salt compound;
(II) particles of 45 µm or smaller diameter account for at least 90 wt. % of each of the materials (A) and (B); and
(III) the material (A) is higher than the material (B) in melt viscosity (Pa·s) measured at 130° C.

2. A powder coating composition according to claim 1, wherein the onium salt compound is a phosphonium salt compound.

3. A powder coating composition according to claim 1, wherein the proportion of the onium salt compound is 0.01 to 10 parts by weight relative to 100 parts by weight of the base resin of the material (A).

4. A powder coating composition according to claim 1, wherein the material (A) is at least three times higher than the material (B) in melt viscosity (Pa·s).

5. A powder coating composition according to claim 1, wherein the material (A) has a melt viscosity of 1 to 100 Pa·s.

6. A powder coating composition according to claim 1, wherein the material (B) has a melt viscosity of 0.1 to 10 Pa·s.

7. A powder coating composition according to claim 1, wherein condition (a) is satisfied.

8. A powder coating composition according to claim 1, wherein condition (b) is satisfied.

9. A powder coating composition according to claim 1, wherein condition (c) is satisfied.

10. A powder coating composition according to claim 1, wherein condition (d) is satisfied.

11. A powder coating composition according to claim 1, wherein condition (e) is satisfied.

12. A powder coating composition according to claim 1, wherein condition (f) is satisfied.

\* \* \* \* \*